United States Patent
Cave et al.

(10) Patent No.: US 10,507,909 B2
(45) Date of Patent: Dec. 17, 2019

(54) HELICOPTER AEROFOIL WITH TRAILING EDGE FLAP

(71) Applicant: AGUSTAWESTLAND LIMITED, Somerset (GB)

(72) Inventors: Andrew Cave, Somerset (GB); Simon Stacey, Somerset (GB)

(73) Assignee: AGUSTAWESTLAND LIMITED, Somerset (GB)

( * ) Notice: Subject to any disclaimer, the term of this patent is extended or adjusted under 35 U.S.C. 154(b) by 115 days.

(21) Appl. No.: 15/321,099

(22) PCT Filed: Apr. 21, 2016

(86) PCT No.: PCT/GB2016/051107
§ 371 (c)(1),
(2) Date: Dec. 21, 2016

(87) PCT Pub. No.: WO2016/170341
PCT Pub. Date: Oct. 27, 2016

(65) Prior Publication Data
US 2017/0129596 A1 May 11, 2017

(30) Foreign Application Priority Data

Apr. 21, 2015 (GB) .................................. 1506739.0

(51) Int. Cl.
*B64C 27/467* (2006.01)
*B64C 27/473* (2006.01)
*B64C 27/82* (2006.01)

(52) U.S. Cl.
CPC .......... *B64C 27/467* (2013.01); *B64C 27/473* (2013.01); *B64C 27/82* (2013.01)

(58) Field of Classification Search
CPC ..... B64C 27/467; B64C 27/82; B64C 27/473; B64C 27/72; B64C 2027/7222;
(Continued)

(56) References Cited

U.S. PATENT DOCUMENTS

| 2,716,460 A * | 8/1955 | Young | B64C 27/46 244/214 |
| 3,077,934 A * | 2/1963 | Hartswick | B64C 27/30 416/24 |

(Continued)

FOREIGN PATENT DOCUMENTS

| DE | 3908256 | 9/1990 |
| EP | 0939029 | 9/1999 |

(Continued)

OTHER PUBLICATIONS

International Search Report and Written Opinion corresponding to International Application No. PCT/GB2016/051107, dated Jun. 24, 2016.

(Continued)

*Primary Examiner* — Charles G Freay
(74) *Attorney, Agent, or Firm* — Lathrop Gage LLP

(57) ABSTRACT

An aerofoil has a main portion of aerofoil cross section and a trailing edge portion (12) movable with respect to the main portion by an actuating device (14), the trailing edge portion (12) is movable at or about an area/point of flexion A, the area/point of flexion A is located at or adjacent a pressure or suction surface of the aerofoil, the trailing edge portion (12) is connected to the main portion by first and second connection members (18, 20), the first connection member (18) extends inwardly away from the area/point of flexion A and has an end which is directly or indirectly connected to the main portion, the first and second connection members (18, 20) are flexible.

28 Claims, 3 Drawing Sheets

(58) Field of Classification Search
CPC ..... B64C 2027/7283; B64C 2022/7266; Y02T 50/34; Y02E 10/72
See application file for complete search history.

(56) References Cited

U.S. PATENT DOCUMENTS

| | | | |
|---|---|---|---|
| 6,168,379 B1* | 1/2001 | Bauer | B64C 27/001 244/215 |
| 7,594,796 B2 | 9/2009 | De La Grandmaison et al. | |
| 8,191,826 B2* | 6/2012 | Daynes | B64C 3/48 244/99.8 |
| 8,418,968 B2 | 4/2013 | Grip | |
| 9,033,283 B1* | 5/2015 | Hemmelgarn | B64C 3/48 244/219 |
| 2008/0145220 A1 | 6/2008 | Yeh et al. | |
| 2010/0259046 A1* | 10/2010 | Kota | F03D 1/0641 290/44 |
| 2011/0084174 A1* | 4/2011 | Hemmelgarn | B64C 3/48 244/200 |
| 2012/0169060 A1* | 7/2012 | Loh | F03D 1/0641 290/55 |
| 2012/0269632 A1* | 10/2012 | Westergaard | F03D 1/0641 416/159 |

FOREIGN PATENT DOCUMENTS

| | | |
|---|---|---|
| EP | 1085152 | 3/2001 |
| EP | 1780121 | 5/2007 |
| EP | 2769915 | 8/2014 |
| FR | 2821397 | 8/2002 |
| RU | 2167785 C2 | 5/2001 |

OTHER PUBLICATIONS

Search Report of the Great Britain Intellectual Property Office corresponding to Great Britain Application No. GB1506739.0, search completed Oct. 15, 2015.

Russian Patent Application No. 2016146905, Search Report dated Oct. 22, 2018; 2 pgs. (relevance found in citations).

\* cited by examiner

HELICOPTER AEROFOIL WITH TRAILING EDGE FLAP

DESCRIPTION OF INVENTION

This invention relates to an aerofoil, and more particularly, but not exclusively, to a rotating aerofoil or rotor blade.

The invention has been developed specifically for a rotating aerofoil of a helicopter, namely a rotor blade of an anti-torque rotor, or tail rotor, or a rotor blade of a main sustaining rotor system of an aircraft, but the invention may be applied to other aerofoils, for example wind turbine blades.

More particularly, the invention relates to a rotating aerofoil having a trailing portion that is movable with respect to a main portion of the aerofoil, so as to control the helicopter.

Such movable trailing portions can be utilised to modify the aerofoil properties of a rotor blade and this is a well-recognised practice in aviation technology.

Trailing portions may be tilted upwardly or downwardly relative to the remainder of the aerofoil body, in order to optimise the performance of the blade over a wide range of rotation speeds, as well as for vibration and/or acoustic noise reduction.

US 2008/0145220 discloses a helicopter rotor blade having a blade body and a control flap that is secured to the blade body. The control flap is movable with respect to the blade body through a range of motion. It is to be appreciated that the rotation axis of the control flap is positioned along the centreline of the aerofoil when the blade is viewed in cross section (see FIG. 2 of US 2008/0145220, for example). This can present various problems. For instance, internal space constraints within the blade body present significant challenges when attempting to scale this concept to practice.

FR2821397 discloses a wing having an aerofoil part 2 and a flap 3 that can be moved about an elastic strip hinge 7A by connecting members 11. It is to be appreciated that the rotation axis of the flap 3 is positioned along the centreline of the aerofoil part 2 and, therefore, that this wing suffers from the same problems identified above. Moreover, the arrangement disclosed in FR2821397 can be problematic in that the elastic strip hinge 7A can buckle under the extreme vertical sheer forces that are experienced by the flap 3, in use. There is a need, therefore, to provide an aerofoil having a hinge that can provide strength to the aerofoil to resist such extreme vertical sheer forces.

Embodiments of the present invention seek to provide an improved aerofoil. In some embodiments, the present invention seeks to provide an aerofoil having a movable trailing edge portion, the trailing edge portion being controllable using minimal energy and/or being accurately controllable. Embodiments of the invention also seek to provide an aerofoil that is scalable from concept to practice whilst at the same time is configured to efficiently absorb energy derived from forces subjected to the trailing edge portion. Embodiments of the invention seek to provide an aerofoil having a hinge that can provide strength to the aerofoil (specifically, to provide strength between a main portion and a trailing edge portion) to resist vertical sheer forces, in use.

In one aspect of the invention, we provide an aerofoil (such as a helicopter rotor blade) having a main portion of aerofoil cross section and a trailing edge portion movable with respect to the main portion by an actuating device, wherein the trailing edge portion is movable at or about an area/point of flexion A, the area/point of flexion A being located at or adjacent a pressure or suction surface of the aerofoil, wherein the trailing edge portion is connected to the main portion by first and second connection members, the first connection member extending inwardly away from the area/point of flexion A and having an end which is directly or indirectly connected to the main portion, wherein the first and second connection members are flexible.

The first and second connection members may be configured to flex upwardly when the actuating device is operated to move the trailing edge portion upwardly with respect to the main portion, such that the area/point of flexion A is disposed upwardly.

The first and second connection members may be configured to flex downwardly when the actuating device is operated to move the trailing edge portion downwardly with respect to the main portion, such that the area/point of flexion A is disposed downwardly.

The main portion may include a framework to which one or both of the first and second connection members is connected, the framework being configured to provide support for the first and second connection members.

Advantageously, the framework may also act to absorb energy derived from force applied to the trailing edge portion.

The framework may include at least one support element.

In some embodiments, at least one support element may be in the form of a polygon when the aerofoil is viewed in cross section. The framework may include additional support elements having the same or a different configuration.

The first and second connection members may be disposed with respect to one another at an angle in a range of from about 5° to about 50° or in a range of from 5° to 50°.

The first and second connection members may be disposed with respect to one another at an angle in a range of from about 10° to about 45° or in a range of from 10° to 45°.

The first and second connection members may be disposed with respect to one another at an angle in a range of from about 20° to about 35° or in a range of from 20° to 35°, such as from about 20° to about 30° or in a range of from 20° to 30°.

In some embodiments, the inventors have found that the first and second connection members mitigate local strain about the area/point of flexion A most efficiently when disposed from one another at an angle of from about 20° to about 22° or in a range of from 20° to 22°.

The first and second connection members may at least partially define a cavity when the aerofoil is viewed in cross section.

The cavity may be further defined by part of the framework of the main portion.

The cavity may be provided with an inertia damper.

The inertia damper may comprise an elastomeric material.

The inertia damper may be configured to deform when subjected to energy derived from force subjected, in use, to the trailing edge portion.

The inertia damper may be configured to return to its original shape or its approximate original shape when no force is subjected to the trailing edge portion.

The second connection member may form a part of an outer surface of the aerofoil.

In some embodiments, the aerofoil may include an outer skin within which the main portion and the trailing edge portion are confined, and wherein the second connection member is provided beneath the surface of the outer skin.

It is to be appreciated that the area/point of flexion A is located at or adjacent the outer surface of the aerofoil, so that the pivot point between the main portion and the trailing edge portion is also located at or adjacent the outer surface of the aerofoil.

An area/point of flexion A may be provided in both of the pressure and suction surfaces of the aerofoil. The skilled person understands that the terms pressure surface and suction surface relate to the respective lower and upper surfaces when the aerofoil is viewed from the side.

The actuating device may include an actuator unit and at least one actuator rod, the or each actuator rod being directly or indirectly connected to the trailing edge portion.

The actuating device may be configured to transmit a push/pull force to the or each actuating rod, such that the or each actuating rod controls movement of the trailing edge portion with respect to the main portion. It is preferable that the trailing edge portion pivots about the main portion at the area/point of flexion A.

The actuating unit may include piezoelectric elements.

In embodiments, the actuating unit may include a hydraulic and/or mechanical drive mechanism, such as an electromechanical actuator.

One or both of the first and second connection members may be formed from a thermosetting polymer (such as a fibre reinforced thermosetting polymer) or a thermoplastic polymer (such as a thermoplastic composite polymer).

One or both of the first and second connection members may be formed of a single component having a substantially constant thickness therealong.

In some embodiments, one or both of the first and second connection members may be comprised of more than one layer. For example, one or both of the first and second connection members may include one or more additional layers provided on an outer surface of a foundation layer.

The or each additional layer may be formed from the same or a different material to that of the foundation layer.

The or each additional layer may at least partially cover the outer surface of the foundation layer. For example, the or each additional layer may be located at or about the midpoint of the foundation layer and not be located at or about one or both ends of the foundation layer.

In some embodiments the invention relates to a helicopter including at least one rotating aerofoil according to any one of the preceding embodiments.

Further features of the invention are set out in the dependent claims thereto which are appended hereto.

Embodiments of the various aspects of the invention will now be described by way of example only, with reference to the accompanying drawings, of which:

Figure 1:
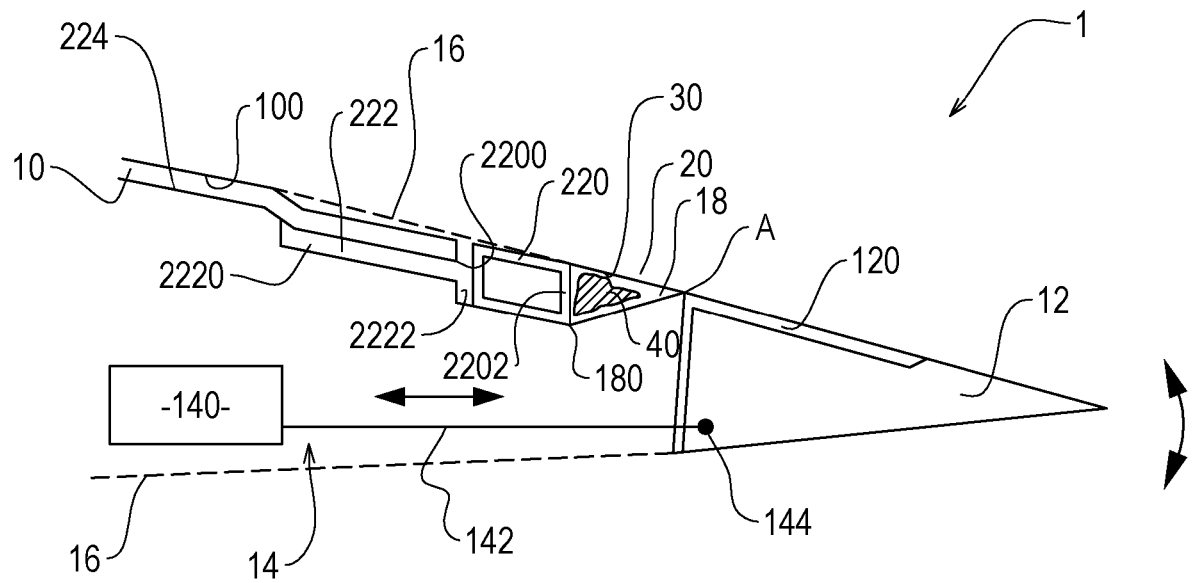
FIG. 1 is an illustration showing a cross sectional view of an aerofoil according to an embodiment of the invention, in a neutral configuration.
Figure 2:
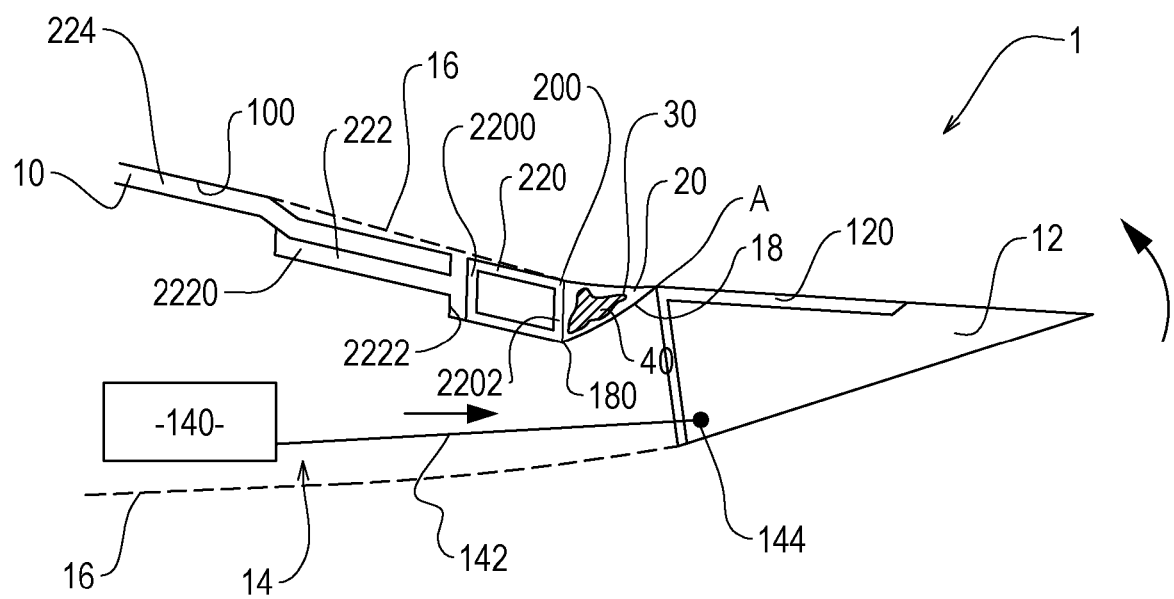
FIG. 2 shows the aerofoil of FIG. 1, in a configuration whereby the trailing edge portion has been moved upwardly with respect to the remainder of the aerofoil.
Figure 3:
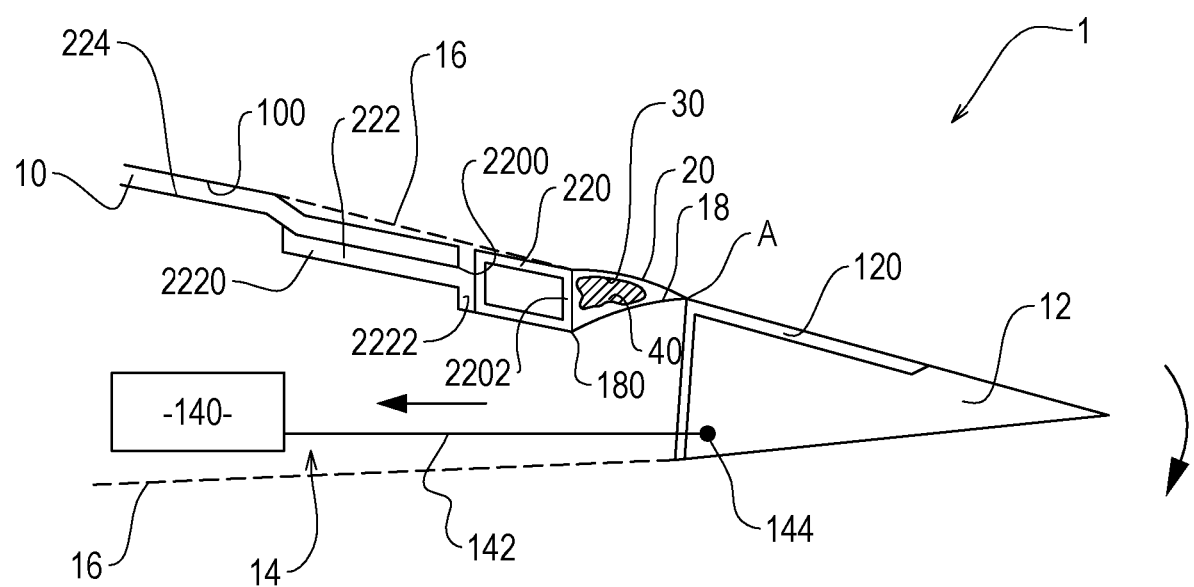
FIG. 3 shows the aerofoil of FIG. 1, in a configuration whereby the trailing edge portion has been moved downwardly with respect to the remainder of the aerofoil.

FIGS. 1 to 3 show a part of an aerofoil, indicated generally at 1, including a main portion 10 and a trailing edge portion 12 movable with respect to the main portion 10 by an actuating device 14. The aerofoil 1 is shown in cross section. The leading edge of the aerofoil 1 has been omitted in order to simplify the drawings. The main portion 10 may include a main portion framework 100 and the trailing edge portion 12 may include a trailing edge portion framework 120. The aerofoil 1 typically includes an outer skin 16 within which the main portion framework 100 and trailing edge portion framework 120 are confined. As the trailing edge portion 12 moves (e.g. pivots) with respect to the main portion 10 the geometry of the outer skin 16 changes and this causes a change in the aerodynamic properties of the aerofoil 1.

In embodiments, the actuating device 14 may include an actuator unit 140 and an actuator rod 142. The actuator rod 142 may be directly or indirectly coupled to the trailing edge portion 12. In the illustrated embodiment the actuator rod 142 is coupled to the trailing edge portion 12 by a connector 144 about which the actuator rod 142 can pivot. Variants to the mechanism in which the actuator rod 142 is coupled to the trailing edge portion 12 are envisaged, without departing from the scope of the invention. For instance, the actuator rod 142 may be replaced with a force transmitting member such as the connection members described in FR2821397.

The actuator unit 140 may include piezoelectric elements, for example a piezoelectric ceramic material, such that when an electric current is applied to the piezoelectric material the shape of the material changes thereby transmitting a force to the actuator rod 142. The actuating device 14 is thereby configured to transmit a push/pull force to the actuator rod 142, such that the actuator rod 142 controls movement of the trailing edge portion 12 with respect to the main portion 10.

In other embodiments the actuating device 14 may include a hydraulic or mechanical drive mechanism (not shown) for controlling movement of the trailing edge portion 12.

In some embodiments, the actuating device 14 may not include an actuator rod 142. Instead, the trailing edge portion 12 may be movable by alternative mechanisms known to a person skilled in the art.

The aerofoil 1 includes first and second connection members 18, 20. The connection members 18, 20 connect the trailing edge portion 12 to the main portion 10.

In embodiments, one or both of the connection members 18, 20 may be formed of a fibre reinforced thermosetting polymer or a thermoplastic composite polymer.

Figure 5:
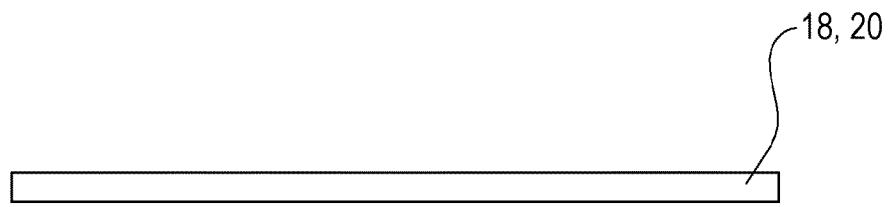
FIG. 5 is a schematic diagram of a connection member according to an embodiment of the invention.

In embodiments, one or both of the connection members 18, 20 may have a substantially constant thickness therealong. FIG. 5 shows an example of such an embodiment.

Figure 6:
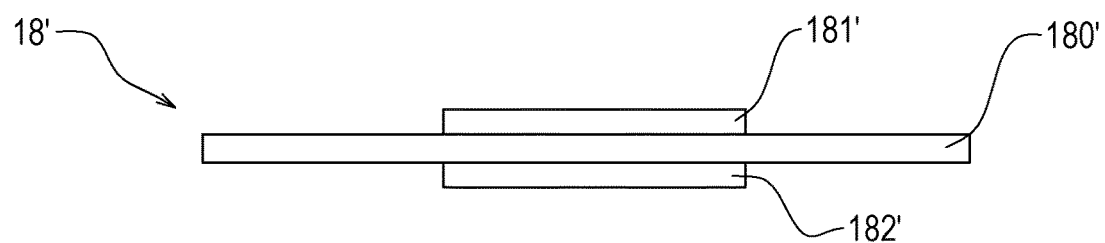
FIG. 6 is a schematic diagram of a connection member according to a further embodiment of the invention.

In some embodiments, one or both of the connection members 18, 20 may include additional layers. FIG. 6, for example, shows a connection member 18' of an alternative embodiment which includes multiple layers. The connection member 18' includes a foundation layer 180' and additional layers 181', 182' provided on an outer surface of the foundation layer 180'. The or each additional layer 181' 182' may be formed from the same or a different material to that of the foundation layer 180'. In embodiments (such as the embodiment shown in FIG. 6), the or each additional layer 181', 182' may cover only a portion of the outer surface of the foundation layer 180'. For example, the additional layers 181', 182' may be located at or about the mid-point of the foundation layer 180', so as to provide additional strength about the mid-point of the connection member 18', to alleviate strain in this region. In some embodiments, of course, the or each additional layer 181', 182' may be located across a different part of the outer surface of the foundation layer 180' to the mid-point, to provide strength to that different part. In some embodiments, the or each additional layer 181', 182' may be located across substantially the entire outer surface (e.g. the entire outer surface) of the foundation layer 180'.

In embodiments, the main portion framework 100 may be formed of a single element.

Alternatively, the main portion framework 100 may include plural support elements, for example two or more support elements, such as two to five support elements. In the embodiment shown in FIGS. 1 to 3, the main portion framework 100 may include first, second and third support elements 220, 222, 224.

FIG. 1 illustrates the aerofoil 1 in a neutral configuration, by which it is meant that the aerofoil 1 has the same shape as would be adopted by an aerofoil without a movable trailing edge portion 12.

The first and second connection members 18, 20 are configured to flex.

Upon actuation of the actuating device 14 the actuator rod 142 moves in a rearward direction towards the trailing edge portion 12, thereby causing the trailing edge portion 12 to move upwardly with respect to the main portion 10 about an area/point of flexion A, such that the area/point of flexion A is disposed upwardly from its neutral configuration. This configuration is illustrated by FIG. 2.

As will be appreciated, the area/point of flexion A is located at or about the outer surface of the aerofoil 1. Having the area/point of flexion A (i.e. the axis of rotation) at this location maximises the distance between the area/point of flexion A and the connector 144, and this leads to a number of advantages. The distance between the area/point of flexion A and the connector 144 is known as the moment arm length. Having a long moment arm means that less force needs to be applied to the actuator rod 142 in order to rotate the trailing edge portion 12 about the area/point of flexion A than would be required if the moment arm was shorter. Moreover, a long moment arm means that the degree of rotation of the trailing edge portion 12 with respect to the main portion 10 can be very accurately controlled. In other words, a relatively large displacement of the actuator rod 142 can result in a small change in angular displacement of the trailing edge portion 12. Having a short moment arm (such as described in US 2008/0145220) can mean that it is difficult to cause accurate changes in angular displacement of the trailing edge portion with respect to the main portion.

It is also possible upon actuation of the actuating device 14 to move the actuator rod 142 in a forward direction towards the leading edge (not shown) of the aerofoil 1 to cause the trailing edge portion 12 to move downwardly with respect to the main portion 10 about the area/point of flexion A, such that the area/point of flexion A is disposed downwardly from its neutral configuration. This configuration is illustrated by FIG. 3.

Upward and downward movement of the trailing edge portion 12 in this manner suppresses undesirable aerodynamic forces that contribute to noise and aircraft vibration. Such movement of the trailing edge portion 12 also compensates for the loss of lift of a retreating aerofoil 1 during translational flight. It is to be appreciated, therefore, that the trailing edge portion 12 is subjected to huge forces during use, particularly forces derived from load applied in a direction perpendicular to the aerofoil chord line (as will be understood by a person skilled in the art, the aerofoil chord line is the straight line connecting the leading edge to the trailing edge). These forces are known as vertical sheer forces.

The first connection member 18 is configured to extend inwardly into the aerofoil's interior cavity and away from the area/point of flexion A. The first connection member 18 has an end 180 which is directly or indirectly connected to the main portion 10.

Advantageously, this configuration means that the vertical sheer forces subjected to the trailing edge portion 12 (e.g. when the trailing edge portion 12 is moved downwardly with respect to the main portion 10) can be absorbed by the first connection member 18. The arrangement of the first connection member 18 therefore prevents the second connection member 20 from buckling under stress. Thus, the purpose of the first connection member 18 is to provide strength to the aerofoil 1 to allow the second connection member 20 to function as a hinge due to its flexible nature. To dispense with the first connection member 18 would mean that the second connection member 20 would need to be made stiffer (in order to cope with the vertical sheer forces) and this would mean that the second connection member 20 would no longer be able to function as a hinge, which is undesirable. It could be said, therefore, that the first and second connection members 18, 20 together define a triangular hinge, whereby said triangular hinge provides strength to the aerofoil 1 between the main portion 10 and the trailing edge portion 12 to resist such extreme vertical sheer forces that are experienced in use. The Applicant has determined that such a triangular hinge is more effective in terms of resisting vertical sheer forces than other hinge configurations, such as the strip hinge of FR2821397.

In embodiments, the second connection member 20 may form a part of the outer skin 16 of the aerofoil 1. Alternatively, the second connection member 20 may be provided beneath a surface of the outer skin 16, such that the outer skin 16 adopts the same profile or shape as the second connection member 20 when the second connection member 20 changes form.

The second connection member 20 may be directly or indirectly connected to the main portion 10. For instance, an end 200 of the second connection member 20 may be directly or indirectly connected to the main portion 10.

Advantageously, this configuration means that the vertical sheer forces subjected to the trailing edge portion 12 (e.g. when the trailing edge portion 12 is moved upwardly with respect to the main portion 10) can be absorbed by the second connection member 18 in a similar manner as described above with respect to the first connection member 18.

In the illustrated embodiment of FIGS. 1 to 3, the respective ends 180, 200 of the first and second connection members 18, 20 are connected to the first support element 220. The first support element 220 is connected to (and hence supported by) the second 222 and third 224 support elements.

Advantageously, the support elements 220, 222, 224 provide further support to the trailing edge portion 12 to allow it to pivot in the manner described above.

In embodiments, the first support element 220 may be in the form of a polygon, for example a four, five or six-sided polygon, when the aerofoil 1 is viewed in cross section. In the embodiment shown in FIGS. 1 to 3, the first support element 220 is in the form of a parallelogram when viewed in cross section. It is envisaged that the first support element 220 of some embodiments of the invention may take the form of a pentagon or a hexagon.

In embodiments, the second support element 222 may be connected to the third support element 224. The second support element 222 may include a first part 2220 connected to the third support element 224, and a second part 2222 extending from the first part 2220. Preferably, a forward facing surface 2200 of the first support element 220 is in direct or indirect contact with the second part 2222 of the second support element 222.

In embodiments, the first and second connection members 18, 20 are disposed with respect to one another at an angle in a range of from about 10° to about 50° or in a range of from 10° to 50°. Irthe illustrated embodiments the first and second connection members 18, 20 are disposed with respect to one another at an angle of about 20° to 22°, as it was found that an angle in this range was most effective at alleviating local strain in the first and second connection members 18, 20 when the trailing edge portion is subjected to force, e.g. vertical sheer force.

As will be appreciated, a cavity 30 is at least partly defined by the first and second connection members 18, 20. A rearward facing surface 2202 of the first support member 220 optionally further defines the cavity 30.

Improvements in controlling angular movement of the trailing edge portion 12 have been realised by providing the cavity 30 with an inertia damper 40. In particular, it has been found that the trailing edge portion 12 has improved stability when it pivots about the main portion 10 than in aerofoils where there is no inertia damper 40 provided in the cavity 30. The inertia damper 40 may be configured to deform when the trailing edge portion 12 moves with respect to the main portion 10. It has been found that the presence of such an inertia damper 40 results in a smoothing of the transfer of energy from the trailing edge portion 12 to the main portion 10.

In embodiments, the inertia damper 40 may comprise an elastomeric material, such as polyurethane. Alternatively, materials such as rubber, silicone or latex may be utilised.

Advantageously, the inertia damper 40 may be further configured to return to its original shape when no force is applied to the trailing edge portion 12. In other words, the inertia damper 40 may be formed from a shape-memory material. Shape-memory materials are known in the art and do not need to be discussed in further detail.

Figure 4:
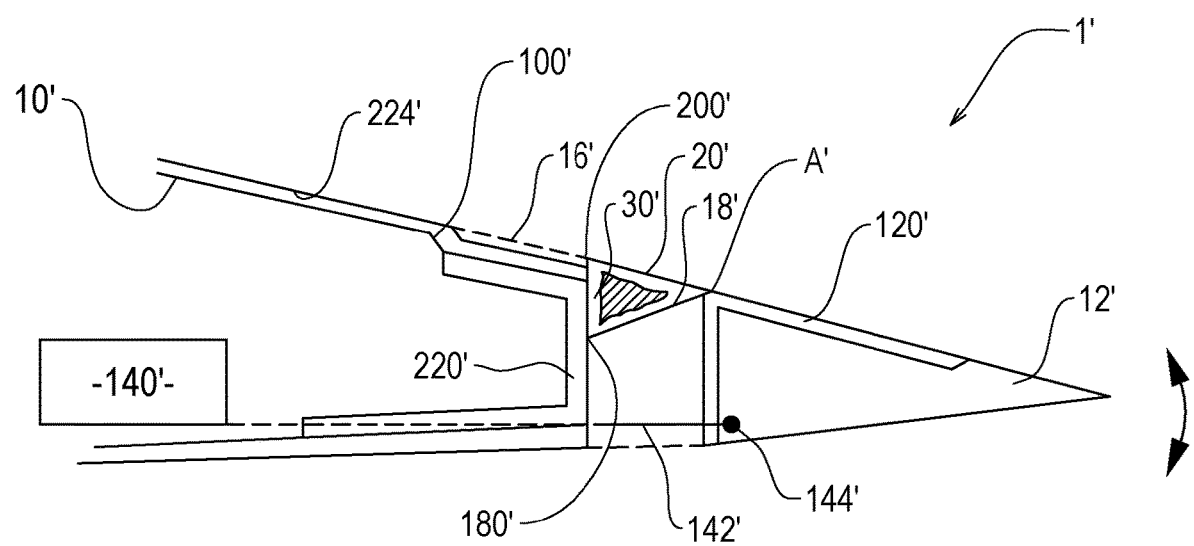
FIG. 4 is an illustration showing a cross sectional view of an aerofoil according to a further embodiment of the invention, in a neutral configuration.

FIG. 4 shows an aerofoil according to an alternative embodiment of the invention, denoted generally be reference numeral 1'. Components of the aerofoil 1' similar to those of the aerofoil 1 are assigned the same number but are denoted with a prime (').

The only notable difference between the aerofoils 1 and 1' is that the main portion framework 100' of aerofoil 1' includes first and second support elements 220', 224', whereas the main portion framework 100 of aerofoil 1 includes three support elements 220, 222, 224.

The aerofoil 1' operates in a very similar the same manner as described above with respect to the aerofoil 1.

In the illustrated embodiments the area/point of flexion A, A' is provided in the upper surface of the aerofoil 1, 1' as depicted in the figures. It is to be appreciated that the invention applies equally to embodiments whereby the area/point of flexion A, A' is provided in the lower surface of the aerofoil 1, 1'. Additionally, it is to be appreciated that the application is intended to cover embodiments whereby there is more than one area/point of flexion A, A' (for instance, provided in both the upper and lower surfaces of the aerofoil 1, 1').

Embodiments of the invention provide an improved aerofoil. In particular, the provision of an axis of rotation (i.e. the area/point of flexion A, A') at or about the outer surface of an aerofoil 1, 1' means that the trailing edge portion 12, 12' can be controlled using minimal energy and be more accurately due to the aerofoil 1, 1' having a long moment arm. The presence of the first connection member 18, 18' means that it is possible to locate the area/point of flexion A, A' at or about the outer surface of the aerofoil; this is because the first connection member 18, 18' provides structural support to enable the second connection member 20, 20' to function appropriately as a hinge.

To summarise, the provision of an aerofoil having a trailing edge portion that is movable about a triangular hinge located at or about a suction or pressure surface of the aerofoil, such that the axis of rotation is located at or about the suction or pressure surface, results in an improved aerofoil in terms of accurate control of the trailing edge portion and in terms of strength around the juncture between the trailing edge portion and the main portion to which it is connected.

In addition, further structural improvements have been realised by providing the aerofoil 1, 1' with plural support elements for supporting the connection members 18, 18'; 20, 20'.

The provision of an inertia damper 40, 40' provided in a cavity defined by the first and second connection members 18, 18'; 20, 20' and, optionally, a part of a support element has also been found to improve controlling angular movement of the trailing edge portion 12, 12' with respect to the main portion 10, 10'. In particular, it has been found that the trailing edge portion 12, 12' experiences improved stability during movement.

The figures are intended to show illustrations of embodiments according to the invention. It is to be understood that a "real-life" aerofoil may differ in visual appearance. It is also to be appreciated that the extent of the range within which the trailing edge portion 12, 12' can move is purely illustrative—in "real-life" aerofoils the extent of the range of motion of the trailing edge portion may be greater/lesser than that shown in the drawings.

In the description and in the claims the terms upwardly, downwardly, rearward, forward and so forth are used for descriptive purposes only. It is to be appreciated that embodiments of the invention described herein are capable of operation in other orientations than shown and the terms so used are only for the purpose of describing relative positions and are interchangeable under appropriate circumstances.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An aerofoil having a main portion of aerofoil cross section and a trailing edge portion movable with respect to the main portion by an actuating device, the aerofoil defining an interior cavity, wherein the trailing edge portion is movable at or about an axis of rotation, the axis of rotation being located at a pressure or suction surface of the aerofoil, wherein the trailing edge portion is connected to the main portion by first and second connection members, the first connection member extending into the interior cavity away from the axis of rotation and having an end which is directly or indirectly connected to the main portion, wherein the first and second connection members are flexible and wherein the first connection member is configured to prevent the second connection member from buckling under stress when the trailing edge portion is exposed to vertical sheer force.

2. An aerofoil according to claim 1, wherein the main portion includes a framework to which one or both of the first and second connection members is connected, the framework being configured to absorb energy derived from force subjected, in use, to the trailing edge portion.

3. An aerofoil according to claim 2, wherein the framework includes at least one support element.

4. An aerofoil according to claim 3, wherein said at least one support element is in the form of a polygon when the aerofoil is viewed in cross section.

5. An aerofoil according to claim 1, wherein the first and second connection members are disposed with respect to one another at an angle in a range of from about 5° to about 50°.

6. An aerofoil according to claim 1, wherein the first and second connection members are disposed with respect to one another at an angle in a range of from about 10° to about 45°.

7. An aerofoil according to claim 1, wherein the first and second connection members are disposed with respect to one another at an angle in a range of from about 20° to about 35°.

8. An aerofoil according to claim 1, wherein the first and second connection members are disposed with respect to one another at an angle in a range of from about 20° to about 22°.

9. An aerofoil according to claim 1, wherein the first and second connection members at least partially define a cavity when the aerofoil is viewed in cross section.

10. An aerofoil according to claim 9, wherein the cavity is further defined by a framework of the main portion.

11. An aerofoil according to claim 9, wherein the cavity is provided with an inertia damper.

12. An aerofoil according to claim 11, wherein the inertia damper comprises an elastomeric material.

13. An aerofoil according to claim 11, wherein the inertia damper is configured to deform when subjected to energy derived from force subjected, in use, to the trailing edge portion.

14. An aerofoil according to claim 11, wherein the inertia damper is further configured to return to its original shape when there is no force subjected to the trailing edge portion.

15. An aerofoil according to claim 1, wherein the second connection member forms a part of an outer surface of the aerofoil.

16. An aerofoil according to claim 1, wherein the aerofoil includes an outer skin within which the main portion and trailing edge portion are confined, and wherein the second connection member is provided beneath the surface of the outer skin.

17. An aerofoil according to claim 1, wherein the actuating device includes an actuator unit and at least one actuator rod, the or each actuator rod being directly or indirectly coupled to the trailing edge portion.

18. An aerofoil according to claim 17, wherein the actuating device is configured to transmit a push/pull force to the or each actuating rod, such that the or each actuating rod controls movement of the trailing edge portion with respect to the main portion.

19. An aerofoil according to claim 17, wherein the actuating unit includes piezoelectric elements.

20. An aerofoil according to claim 1, wherein one or both of the first and second connection members is formed from a thermosetting polymer or a thermoplastic polymer.

21. An aerofoil according to claim 1, wherein one or both of the first and second connection members is formed of a single component having a substantially constant thickness therealong.

22. An aerofoil according to claim 1, wherein one or both of the first and second connection members is comprised of more than one layer.

23. An aerofoil according to claim 22, wherein one or both of the first and second connection members include one or more additional layers provided on an outer surface of a foundation layer.

24. An aerofoil according to claim 23, wherein the or each additional layer is formed from the same material to that of the foundation layer.

25. An aerofoil according to claim 23, wherein the or each additional layer at least partially covers the outer surface of the foundation layer.

26. An aerofoil according to claim 25, wherein the or each additional layer is located at or about a midpoint of the foundation layer and is not located at or about one or both ends of the foundation layer.

27. A helicopter including at least one rotating aerofoil according to claim 1.

28. An aerofoil according to claim 23, wherein the or each additional layer is formed from a different material to that of the foundation layer.

* * * * *